(No Model.)
G. W. STOCKMAN.
AMMONIA REFRIGERATING APPARATUS.
No. 264,113. Patented Sept. 12, 1882.
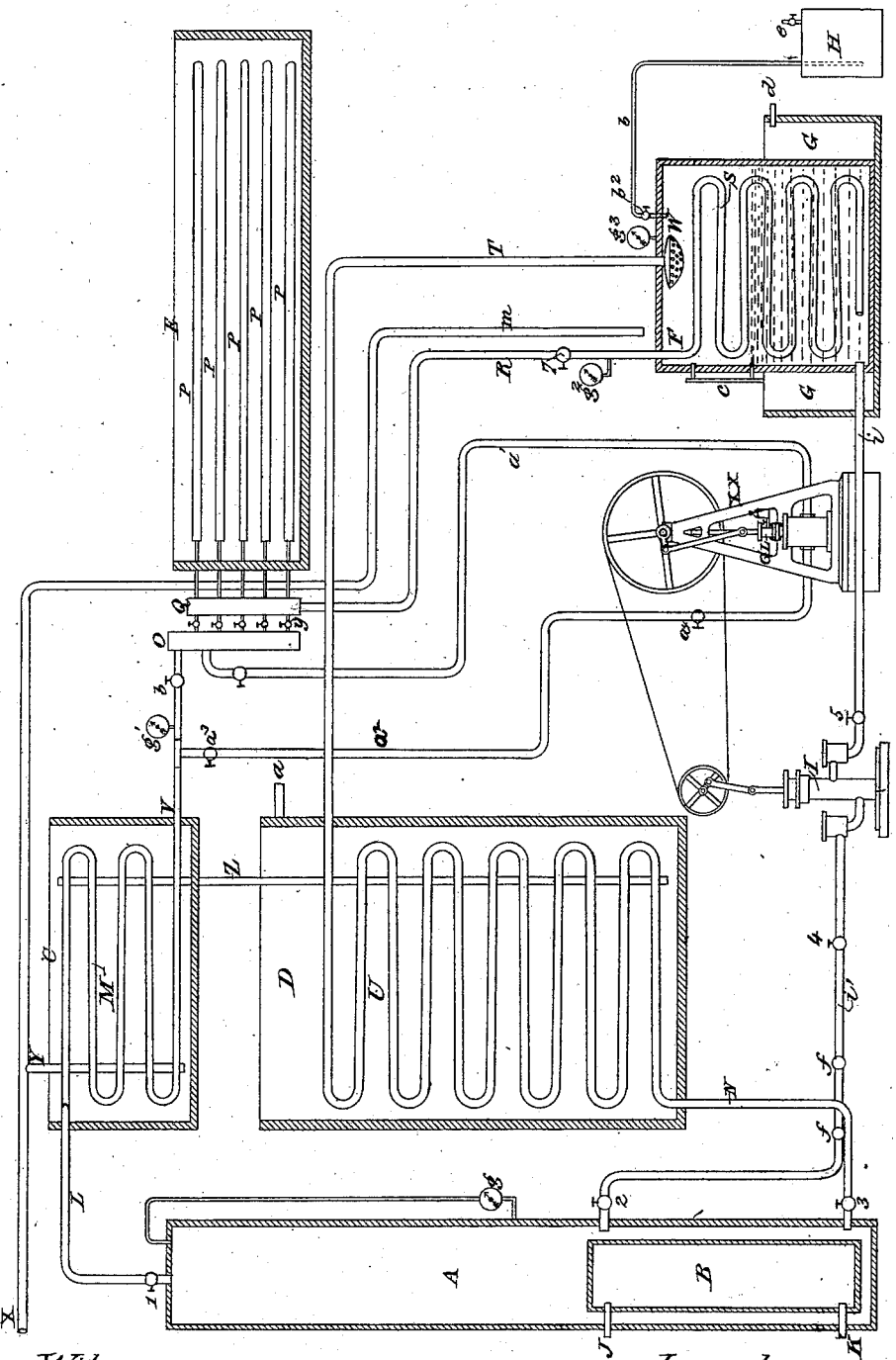

UNITED STATES PATENT OFFICE.

GEORGE W. STOCKMAN, OF INDIANAPOLIS, INDIANA.

AMMONIA REFRIGERATING APPARATUS.

SPECIFICATION forming part of Letters Patent No. 264,113, dated September 12, 1882.

Application filed March 9, 1882. (No model.)

*To all whom it may concern:*

Be it known that I, GEORGE W. STOCKMAN, of Indianapolis, county of Marion, Indiana, have invented an Improvement in Ammonia Refrigerating Apparatus, designed to be used in connection with a previous invention for which Letters Patent No. 245,325 were issued to me August 9, 1881; and I refer to those Letters Patent for a full description of that invention; but in order to explain the present invention some explanation of the previous one is necessary.

A represents a retort or evaporator with heater B. C is a vapor-condenser. D is a cooler for weak or diluted liquor, and E is a refrigerator, all of the ordinary kind.

F represents the shell of the absorber, which is surrounded by the water-jacket G, and H is a purge-tank.

The heater B is provided with a steam-pipe, J, near its top, and pipe K at its base, for carrying off the condensed steam.

The vapor-pipe L leads from the top of the retort A to the condenser C, and is provided with a valve, 1, near the retort.

M is the condensing-coil in the condenser C.

The pipe V has a pressure-gage, $g'$, and valve $b$, and enters the distributer O.

P P P are independent coils of pipe in the refrigerator-box E, one end of each starting from the distributer O, with valves $y$, and discharging at the other end in the collector Q, from which descends a pipe, R, for the spent vapors to pass through into the absorber S. This pipe has a valve, 7, and pressure-gage $g^2$.

N is a pipe leading from the base of the retort A into the cooler D, forming the cooler-coil U, and discharging into the absorber F through the cold-liquor pipe T and the rose-jet or sprinkler W. This pipe N also has a valve, 3, near the retort A, and is used as the weak-liquor pipe.

The cold-water-supply pipe X supplies the condenser C with water through a branch pipe, Y, and through another branch, $m$, cools the absorber F.

Z is a water-pipe leading from the condenser C to the cooler D, and supplies the latter with water. At the top of this cooler is an overflow-pipe, $a$.

The purge-pipe $b$ leads from the top of the absorber F into the tank H, and is provided with a cock, $b^2$. The tank H has a pet-cock, $e$, for discharging its contents.

The shell of the absorber F has a pressure-gage, $g^3$, and a Scotch glass gage, $c$, at one side to show the height of the liquor in the absorber.

The force-pump I is provided with an inlet-pipe, $i$, which leads from the absorber through the water-jacket G to the pump, with a valve, 5, between them. The discharge-pipe $i'$ leads from the pump to the retort, with two check-valves, $ff$, between the valves 2 and 4, as shown.

$a^2$ is a branch pipe leading from the pipe V, and having valves $a^3$ and $a^4$, to an engine, $xx$, upon the cylinder of which is placed a stuffing-box, L, which may be filled with glycerine or any other incongealable liquid. $a'$ is the exhaust-pipe leading from the cylinder of the engine to the distributer O.

The operation of my apparatus is as follows: The retort A is charged with aqua-ammonia about two-thirds full. The absorber F is charged with the same about half full. The retort is made to withstand a very high pressure, and by means of steam in the heater B (or any other mode of heating) the ammonia in the retort is evaporated and passes through pipe L into the condenser C, where it is reduced again to a liquid state. As it passes out the pipe V it begins to vaporize, being relieved of pressure, and rapidly absorbs heat and reduces the surrounding temperature. If the valve $b$ is opened slightly, the gas will flow into the distributer O and through each of the coils P, returning into the collector Q, and passing thence downward into the absorber S and into the fluid contained therein, making it rich liquor, and from thence is taken out through pipe $i$ into the pump, and again forced into the retort. The weak liquor from the retort is carried off through pipe N into the coil $u$, and from thence through pipe T into the absorber, where it is enriched and mingles with the other liquid, to be taken up by the pump. If the valve $a^3$ be slightly opened, the anhydrous ammonia becomes vaporized and expands rapidly, and, passing downward through pipe $a^2$, enters the steam-chest of the engine, and from thence into the cylinder, and after serving as a motor there it exhausts through pipe $a'$, to enter the refrigerator-coils P in the usual way.

The stuffing-box being filled with glycerine prevents the freezing of the piston-rod in the cylinder.

By this apparatus I design to use the ammonia-vapor to drive the engine that works the pump, and let the exhaust-vapor enter the refrigerating-coils to finish its work there. The valves $a^3$ and $b$ may both be open at the same time, if desired; or, if the exhaust-vapor is sufficient for the purpose of freezing, the valve $b$ may be closed.

What I claim, and desire to secure by Letters Patent, is—

1. In an ammonia refrigerating apparatus, the conduction, by means of suitable pipes, of sufficient vapor from the supply-pipe to the engine to drive the pumps, in combination with means for exhausting the vapor from the cylinder into a refrigerating coil or chamber.

2. In combination with the cylinder of an engine driven by ammonia-vapor, a stuffing box or sleeve filled with incongealable liquid, substantially as and for the purpose herein described.

In witness whereof I have hereunto set my hand this 6th day of March, 1882.

GEO. W. STOCKMAN.

Witnesses:
SAMUEL STEPHENS,
JOHN J. WHEAT.